UNITED STATES PATENT OFFICE.

OTTO NICHOLAS WITT, OF WESTEND, NEAR BERLIN, GERMANY, ASSIGNOR TO ACTIEN GESELLSCHAFT FÜR ANILIN FABRIKATION, OF BERLIN, GERMANY.

STABLE NITROBENZENE-DIAZONIUM DERIVATIVES.

1,093,567.  Specification of Letters Patent.  Patented Apr. 14, 1914.

No Drawing.  Application filed July 17, 1913. Serial No. 779,632.

*To all whom it may concern:*

Be it known that I, OTTO NICHOLAS WITT, a citizen of the German Empire, residing at Westend, near Berlin, Germany, my post-office address being Ebereschenallee 10, Westend, near Berlin, Germany, have invented certain new and useful Improvements in Stable Nitrobenzene-Diazonium Derivatives, of which the following is a specification.

It is well known, that nitrobenzene-diazonium salts find an extensive application in the dyeing and printing of cotton goods. Owing to their instability, however, they must be freshly prepared immediately before use, by diazotizing nitranilin in the presence of acids in large excess and of ice. Their preparation requires considerable attention and skill; the necessity of using ice is a cause for difficulties and increase of cost, especially in summer and in tropical climates.

Several products prepared from nitrobenzene-diazonium salts for the purposes of dyeing baths and printing-colors are known, all of which, however, are rather sensitive and most of which show besides a strongly acid reaction. The most stable of these compounds, and the only one which in its commercial form has a neutral reaction, is the 4-nitrophenyl-nitrosamin, which must however be transformed into a diazonium salt by the addition of acids.

My present invention relates to compounds, which, though still true diazonium derivatives, are stable and strictly neutral. They are double salts of a naphthalene-sulfonic acid with two bases, one of which is nitrobenzene-diazonium, while the other is a metal. They may be produced by acting with naphthalene-sulfonic acid, equivalent to two molecular proportions, upon a solution of one molecular proportion of an ordinary nitrobenzene-diazonium salt. The double salts obtained are not identical with the nitrobenzene-diazonium salts, described in the Letters Patent No. 582,853.

Example: A solution of one molecular proportion of 4-nitrobenzene-diazonium chlorid, prepared in the usual way with the help of sodium nitrite and containing an excess of hydrochloric acid, is mixed with a quantity of free naphthalene-2-sulfonic acid, corresponding with two molecular proportions. The color of the liquid turns orange-red and after a short time the double salt begins to settle out. Its crystals may be separated from the mother-liquor by filtration and brought into a commercial form by washing, pressing and drying. If necessary the salt may be recrystallized from water at 50° C. It corresponds to the formula

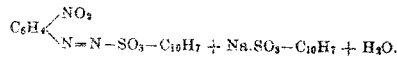

The substance forms silky lemon-yellow needles, soluble to the extent of about 5 per cent. in cold, very easily in warm water. In its solid condition this salt is not explosive and will stand, for a short time, temperatures of over 100° C. Its aqueous solution, which has a strictly neutral reaction, can be heated to 80° C. without decomposition.

Instead of mixing the diazonium salt with naphthalene-sulfonic acid the diazotation of the nitroanilin may be effected in the presence of naphthalene-sulfonic acid. If instead of sodium nitrite equivalent quantities of other nitrites be used, the corresponding double salts of other metals are formed, which are quite analogous to the sodium salt in their constitution and properties. The term metals includes the equivalent in the functions ammonium. The 3-nitrobenzene-diazonium yields a similar double salt. All these salts react easily with 2-naphthol forming with it the well-known scarlet. Their solutions may therefore be used with or without the addition of acids or neutralizing agents for the preparation of dye-baths and printing-colors. They may be kept for weeks without decomposition.

Now, what I claim and desire to secure by Letters Patent, is—

1. As new products the herein described stable nitrobenzene-diazonium derivatives consisting of double salts of a naphthalene-sulfonic acid with a nitrobenzene-diazonium and a metal.

2. As new products the herein described stable nitrobenzene-diazonium derivatives consisting of double salts of a naphthalene-sulfonic acid with a nitrobenzene-diazonium and an alkali metal.

3. As new products the herein described stable nitrobenzene-diazonium derivatives consisting of double salts of naphthalene-2-sulfonic acid with a nitrobenzene-diazonium and an alkali metal.

4. As a new product the herein described stable nitrobenzene-diazonium derivative consisting of the double salt of naphthalene-2-sulfonic acid with 4-nitrobenzene-diazonium and an alkali metal.

5. As a new product the herein described stable nitrobenzene-diazonium derivative consisting of the double salt of naphthalene-2-sulfonic acid with 4-nitrobenzene-diazonium and sodium and corresponding to the formula

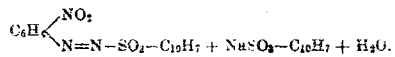

In testimony whereof I have hereunto set my hand in presence of two subscribing witnesses.

OTTO NICHOLAS WITT.

Witnesses:
HENRY HASPER,
WOLDEMAR HAUPT.